(12) United States Patent
Knox et al.

(10) Patent No.: US 9,758,378 B2
(45) Date of Patent: Sep. 12, 2017

(54) SINGLE MODE MICROWAVE DEVICE FOR PRODUCING EXFOLIATED GRAPHITE

(71) Applicants: Michael R. Knox, East Lansing, MI (US); Scott L. Murray, East Lansing, MI (US); Jeffri J. Narendra, Okemos, MI (US)

(72) Inventors: Michael R. Knox, East Lansing, MI (US); Scott L. Murray, East Lansing, MI (US); Jeffri J. Narendra, Okemos, MI (US)

( * ) Notice: Subject to any disclaimer, the term of this patent is extended or adjusted under 35 U.S.C. 154(b) by 0 days.

(21) Appl. No.: 14/938,969

(22) Filed: Nov. 12, 2015

(65) Prior Publication Data

US 2017/0137292 A1    May 18, 2017

(51) Int. Cl.
| | |
|---|---|
| *H05B 6/80* | (2006.01) |
| *C01B 31/04* | (2006.01) |
| *H05B 6/70* | (2006.01) |
| *H05B 6/78* | (2006.01) |

(52) U.S. Cl.
CPC ......... *C01B 31/0423* (2013.01); *H05B 6/701* (2013.01); *H05B 6/78* (2013.01); *H05B 6/80* (2013.01)

(58) Field of Classification Search
CPC .. H05B 6/80; H05B 6/701; H05B 6/78; C01B 31/0469; C01B 31/0423
See application file for complete search history.

(56) References Cited

U.S. PATENT DOCUMENTS

| | | | |
|---|---|---|---|
| 5,537,002 A * | 7/1996 | Price ................ | H01J 23/05 315/39.61 |
| 2013/0134157 A1* | 5/2013 | Knox ................ | H05B 6/80 219/762 |

* cited by examiner

*Primary Examiner* — Daniel C McCracken

(57) ABSTRACT

A device for producing exfoliated graphite from graphite flakes, intercalated graphite, or expanded graphite by means of microwave heating using single mode microwave cavities, a method of producing such materials and products from such methods.

4 Claims, 4 Drawing Sheets

SINGLE MODE MICROWAVE DEVICE FOR PRODUCING EXFOLIATED GRAPHITE

This application claims priority from U.S. Utility patent application Ser. No. 13/686,961, filed Nov. 28, 2012, currently pending, which is a U.S. Utility patent application from U.S. Provisional application Ser. No. 61/629,871, filed Nov. 30, 2011 from which priority is claimed.

BACKGROUND OF THE INVENTION

The present invention is in the technical field of nanotechnology. More particularly, the present invention is in the technical field of nanomaterial manufacturing. More specifically, the present invention is in the technical field of graphite exfoliation.

Graphite is a well known material occurring in natural and synthetic forms. Graphite is made up of layered sheets of hexagonal arrays or network of sp2-carbon atoms, called graphene. A useful form of graphite is exfoliated graphite. Exfoliated graphite generally is exfoliated or partially delaminated graphite having a Braunauer-Emmett-Teller (BET) surface area greater than BET surface area of graphite but less than BET theoretical surface area of single graphene sheet.

Exfoliation of graphite can be performed by applying heat to graphite by a variety of means. Heating by direct application of heat generally requires a significant amount of energy, especially in the case of large-scale production. Radiofrequency (RF) or microwave expansion methods can heat more material in less time at lower cost.

THE INVENTION

In one embodiment, the present invention relates to a microwave device for the production of exfoliated graphite and to products produced by such a device, thus, there is a single mode microwave device, the single mode microwave device comprising a stainless steel housing comprised of a top, a bottom, two side walls, a front, and a moveable back wall, all forming a hollow cavity. The moveable wall has a back surface, and fixedly attached to the back surface is a control rod.

There is contained in the housing an exfoliation tray, the exfoliation tray being supported by at least two support rods which rods are supported at predetermined levels by the side walls. The exfoliation trays are electrically non-conducting.

The bottom, front wall and side walls have a cooling jacket mounted on the outside surfaces and there is an adapter surmounting the top of the housing. The moveable back wall has at least one gas inlet port through it and the bottom of the housing contains an exhaust port.

Fingerstock gaskets or conductive brushes are attached to the edges of the moveable back wall to retain electrical contact between the moveable back wall and the housing and there is a microwave generator to deliver microwave energy to the hollow cavity using a rectangular waveguide that is connected to said adapter. For purposes of this invention, "fingerstock gaskets" and "conductive brushes" are interchangeable.

Fingerstock gaskets are purchasable from www.surplussales.com. A gasket that works particularly well in this invention is 97-440-02M Fingerstock, Cu—Be.

In another embodiment, there is a method of exfoliating graphite, said method comprising providing a nanomaterial and placing the nanomaterial in the hollow cavity of a device as set forth Supra.

Thereafter, moving the moveable back wall of the device such that the nanomaterial is in resonance with the microwave frequency inside the cavity, and heating the cavity until the nanomaterial is exfoliated and thereafter, removing the exfoliated nanomaterial from the hollow cavity.

An additional embodiment is a method for preparing exfoliated graphene, the method comprising using a single mode microwave device as set forth Supra while the single mode microwave device is operating, delivering intercalated graphite at a controlled rate to the exfoliation tray through the delivery chute while controlling the microwave frequencies at a frequency selected from 915 MHz and 2.45 GHz.

Other, additional embodiments are products prepared by the methods as set forth just Supra.

DETAILED DESCRIPTION OF THE INVENTION

The instant invention provides a device for exfoliating intercalated graphite, or expanded graphite by applying microwave energy to the intercalated graphite, or expanded graphite inside a microwave cavity. Such a device is a single mode microwave 1 as shown in FIG. 1.

Figure 1:
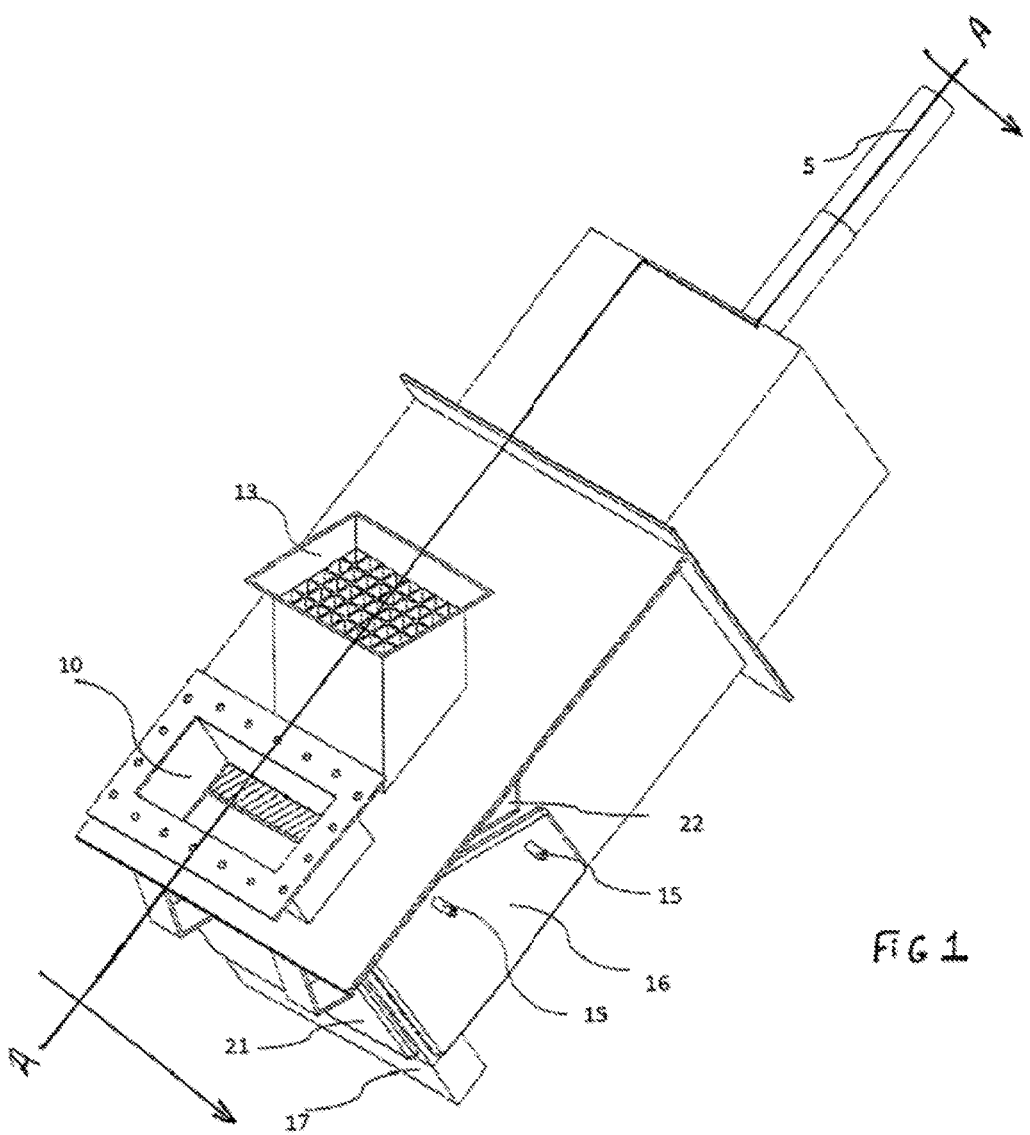
FIG. 1 is a full view in perspective of a microwave device of the present invention.
Figure 2:
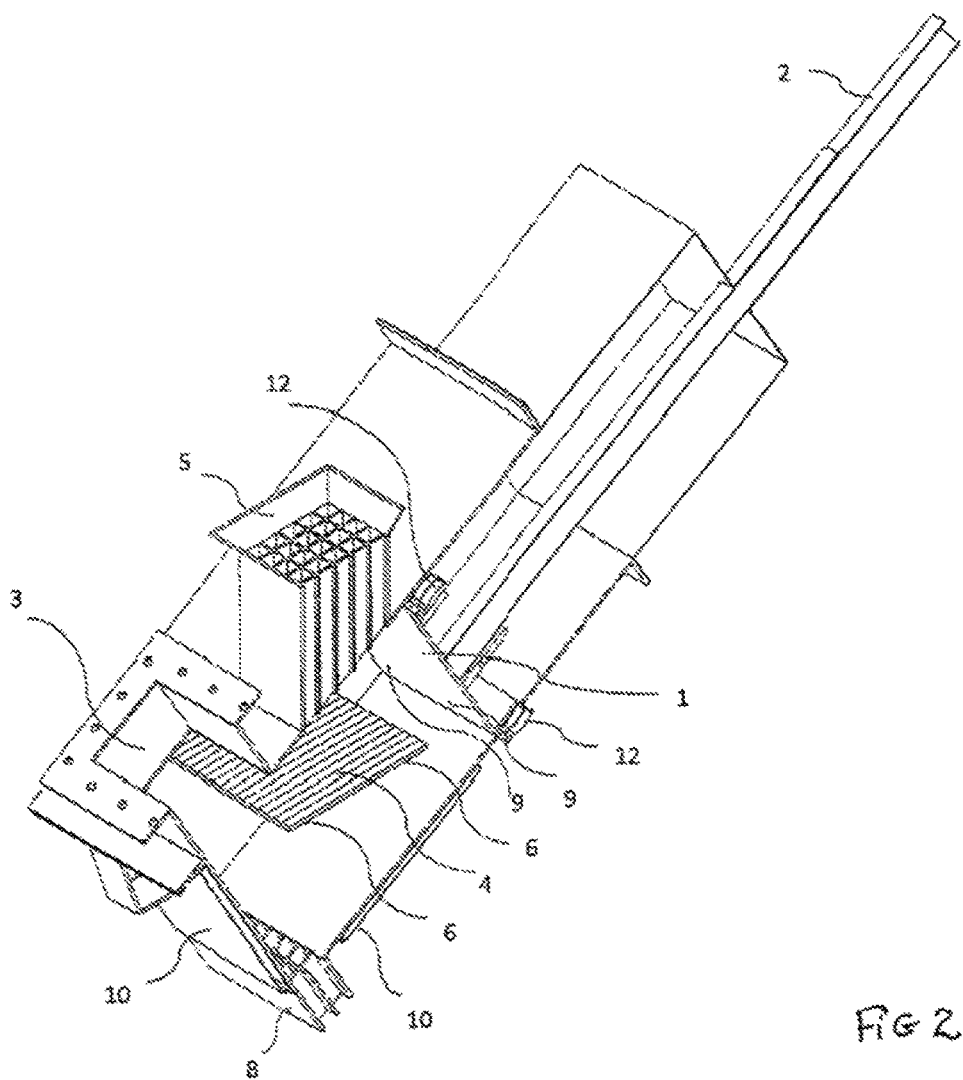
FIG. 2 is a full cross sectional view of the microwave device of FIG. 1 through line A-A.

In FIGS. 1 and 2, the microwave housing 3 is made of stainless steel or of any other metals that exhibit electrical conductivity. The dimensions of the microwave cavity 2 formed by the housing are calculated based on the resonance dimension of the operating frequency of the microwave inside the rectangular cavity. In general, the microwave frequencies used for industrial application in the U.S. are 915 MHz and 2.45 GHz.

To adjust the cavity 2 dimensions, a movable wall 4 is used. This movable wall 4 can be set so that the microwave cavity 2, along with the material inside the microwave cavity 2, is in resonance condition with the microwave frequency. A rod 5 is connected to the movable wall 4 so that the adjustment of the wall's position relative to the dimension of the cavity 2 can be performed outside of the microwave cavity 2. The rod 5 may be either solid or hollow. With this sliding wall feature the dimension of the microwave cavity 2 can be adjusted to allow resonance condition and to produce a specific resonance mode of which its location is at the intercalated graphite load 6 (See FIG. 2). Fingerstock gaskets 7 are attached to the edges 8 of the movable wall 4 to ensure that the wall 4 can be moved while it still electrically connected to the rest of the microwave cavity wall.

Microwave energy is delivered from a microwave generator (not shown) to the microwave cavity 2 using a rectangular waveguide that is connected to an adapter 10 on the top side 11 of the microwave cavity 2. To improve the coupling of the microwave into the cavity, an iris structure may be used.

Figure 3:
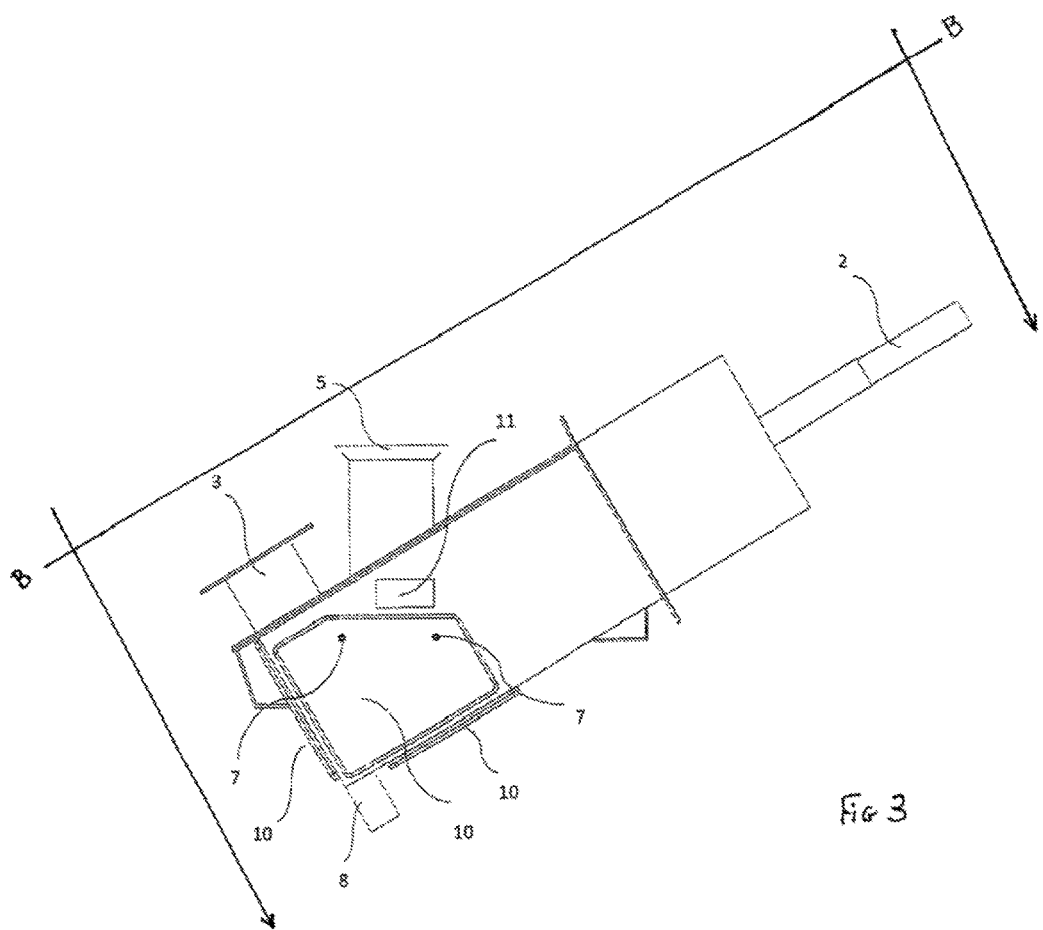
FIG. 3 is a full side view of a microwave device of FIG. 1.

The intercalated graphite or the expanded graphite is dropped at controlled rates to an exfoliation tray 12 inside the microwave cavity 2 using the chute 13 that is located on the top side 11 of the microwave cavity 2. The exfoliation tray 12 is made of non-conductive materials that can withstand high temperature environment. Examples of such materials are fused quartz and alumina. The exfoliation tray 12 is sitting on top two support rods 14 made of similar materials. These rods 14 extend along the width of the microwave cavity 2 and are fastened by outside nipples 15 protruded on the sidewalk 16 of the microwave cavity 2. This configuration of the exfoliation tray 12 and the support rods can be best observed in FIG. 4 which is a full cross sectional side view of the device of FIG. 3 through line B-B.

The exfoliated graphite has a much lower bulk density compared to the intercalated graphite or the expanded graphite. Thus, extracting the exfoliated graphite from the microwave cavity 2 can be done by suspending the exfoliated graphite in air or nitrogen. The microwave cavity exhaust 17, which is connected to a cyclone (not shown), extracts the exfoliated graphite from the microwave cavity 2. To control the suspension velocity of the exfoliated graphite and the gas flow within the cavity 2, compressed air or nitrogen is flown into the microwave cavity 2 from the inlets 18, which are found in the bottom part of the movable wall 4. By flowing compressed air or nitrogen on the bottom part of the microwave cavity 2, the pressure within that region of the microwave cavity 2 drops. The introduction of pressure differential creates a macroscopic drift of air from the top part of the microwave cavity 2 into the bottom part of the microwave cavity 2. Thus, the suspended exfoliated graphite flows downward. The microwave cavity 2 is tilted at an angle to minimize the exfoliated graphite depositing on the microwave cavity 2 bottom wall 19 and to maximize the extraction of the exfoliated graphite using the microwave cavity exhaust 17.

The waveguide is pressurized to prevent the exfoliated graphite from flowing into the waveguide transmission line. The back area of the movable wall 4 is also pressurized to prevent the exfoliated graphite from obstructing the fingerstock gaskets 7.

Figure 4:
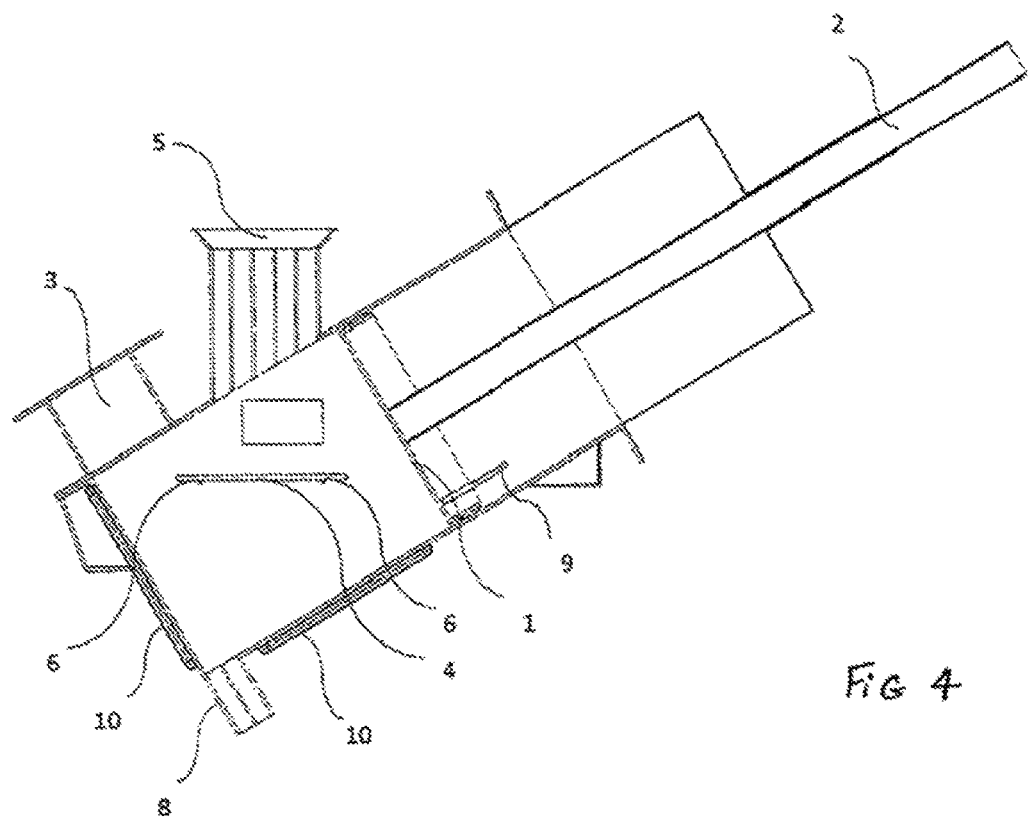
FIG. 4 is a full cross sectional view of the microwave device of FIG. 3 through line B-B.

The chute 13 and the exhaust 17 of the microwave cavity 2 have a grid like structure as seen in FIGS. 2, and 4. This structure is built to prevent microwave radiation. Essentially, the grid can be seen as a group of small waveguides of which their dimensions are small enough that their cutoff frequency is much higher than the operating frequency. Thus, the microwave is attenuated through these waveguides or grids.

The bottom 19, front 20, and part of the sides 16 of the microwave cavity 2 are enclosed with cooling jacket 21 to maintain the microwave cavity wall temperature low, such as below 120 F. The cooling agent is in liquid form such as water or ethylene glycol.

Viewing windows 22 can be built on the side of the microwave cavity 2 to enable one to observe the exfoliation process. The view of the viewing windows 22 can best be observed in FIG. 3, which is a full side view of the device 1 of this invention. The viewing windows 22 are made of perforated metal with holes diameter much less than 1/10 of the wavelength of the operating microwave frequency. The perforated metals are covered with glass or any other optically transparent medium.

What is claimed is:

1. A single mode microwave device, said single mode microwave device comprising:
    a stainless steel housing comprised of a top, a bottom, two side walls, a front, and a moveable back wall, all forming a hollow cavity;
    said moveable wall having a back surface, and fixedly attached to said back surface, a control rod;
    contained within said housing, an exfoliation tray, said exfoliation tray supported by at least two support rods which rods are supported at predetermined levels by the side walls, said exfoliation tray being electrically non-conducting;
    said bottom, front wall, and side walls having a cooling jacket mounted on outside surfaces;
    an adapter surmounting the top of the housing;
    said moveable back wall having at least one gas inlet port therethrough;
    said bottom of said housing containing therein, an exhaust port;
    fingerstock gaskets attached to the edges of the moveable back wall to retain electrical contact between the moveable back wall and the housing;
    a microwave generator to deliver microwave energy to the hollow cavity using a rectangular waveguide that is connected to said adapter.

2. A single mode microwave device as claimed in claim 1 wherein, in addition, there is a viewing window in a side wall.

3. A single mode microwave device of claim 1 having power ranging from 2 to −15 kW.

4. A single microwave device as claimed in claim 1 wherein the microwave power density to exfoliate intercalated graphite or expanded graphite ranges from 100 to 300 W/cm$^3$.

* * * * *